United States Patent
Xie et al.

(10) Patent No.: US 12,242,696 B2
(45) Date of Patent: Mar. 4, 2025

(54) TOUCH SUBSTRATE AND TOUCH DISPLAY DEVICE WITH DISCONNECTED DOTS

(71) Applicants: Hefei Xinsheng Optoelectronics Technology Co., Ltd., Anhui (CN); BOE Technology Group Co., Ltd., Beijing (CN)

(72) Inventors: Xiaodong Xie, Beijing (CN); Min He, Beijing (CN); Jing Wang, Beijing (CN); Xinxiu Zhang, Beijing (CN); Huayu Sang, Beijing (CN); Wenjie Xu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/032,791

(22) PCT Filed: Nov. 19, 2020

(86) PCT No.: PCT/CN2020/130172
§ 371 (c)(1),
(2) Date: Apr. 19, 2023

(87) PCT Pub. No.: WO2022/104654
PCT Pub. Date: May 27, 2022

(65) Prior Publication Data
US 2023/0400950 A1    Dec. 14, 2023

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 2203/04112* (2013.01)

(58) Field of Classification Search
CPC ................ G06F 3/0445; G06F 3/0412; G06F 2203/04112
See application file for complete search history.

(56) References Cited

U.S. PATENT DOCUMENTS

| 9,552,087 | B2 * | 1/2017 | Ullmann | G06F 3/0443 |
| 10,459,592 | B2 * | 10/2019 | Tai | G06F 3/0445 |

(Continued)

FOREIGN PATENT DOCUMENTS

| CN | 203950288 U | 11/2014 |
| CN | 108345417 A | 7/2018 |

(Continued)

OTHER PUBLICATIONS

PCT/CN2020/130172 international search report.

*Primary Examiner* — Afroza Chowdhury
(74) *Attorney, Agent, or Firm* — IPro, PLLC

(57) ABSTRACT

A touch substrate (01) and a touch display device. The touch substrate (01) includes: a base substrate (101); a plurality of first touch electrodes (102) located on the base substrate (101); a plurality of second touch electrodes (103) located on a side, facing away from the base substrate (101), of a layer where the first touch electrodes (102) are located and insulated from the first touch electrodes (102); and a plurality of floating electrodes (104) insulated from the plurality of first touch electrodes (102) and the plurality of second touch electrodes (103), and arranged on the same layer as at least one of the first touch electrodes (102) or the second touch electrodes (103). Each floating electrode (104) has a grid shape, and at least part of the floating electrodes (104) is disconnected at at least part of dots.

11 Claims, 15 Drawing Sheets

(56) References Cited

U.S. PATENT DOCUMENTS

| | | | |
|---|---|---|---|
| 2015/0193035 A1 | 7/2015 | Ullmann et al. | |
| 2015/0212613 A1* | 7/2015 | Fowlkes | G06F 1/16 |
| | | | 174/253 |
| 2017/0153762 A1* | 6/2017 | Kim | G06F 3/0418 |
| 2019/0004638 A1* | 1/2019 | Lee | G06F 3/0412 |
| 2019/0163301 A1 | 5/2019 | Tai et al. | |
| 2019/0179445 A1* | 6/2019 | Moon | G09G 3/2003 |
| 2019/0332201 A1 | 10/2019 | Chen et al. | |
| 2020/0142542 A1* | 5/2020 | Kuriki | G06F 3/0445 |
| 2020/0192525 A1* | 6/2020 | Li | G06F 3/0446 |
| 2020/0357857 A1* | 11/2020 | Park | G06F 3/0446 |
| 2022/0404933 A1 | 12/2022 | Pang et al. | |

FOREIGN PATENT DOCUMENTS

| | | |
|---|---|---|
| CN | 108563364 A | 9/2018 |
| CN | 111651094 A | 9/2020 |
| CN | 111694466 A | 9/2020 |

\* cited by examiner

TOUCH SUBSTRATE AND TOUCH DISPLAY DEVICE WITH DISCONNECTED DOTS

CROSS-REFERENCE TO RELATED APPLICATIONS

The disclosure is a National Stage of International Application No. PCT/CN2020/130172, filed on Nov. 19, 2020, which is hereby incorporated by reference in their entireties.

FIELD

The present disclosure relates to the technical field of touch display, in particular to a touch substrate and a touch display device.

BACKGROUND

The 21st century is an era of information explosion, a variety of high and new technologies are flourishing, and especially Apple, Samsung, LG and other high-tech companies launched a variety of electronic products, enriching people's lives. The products launched by these companies are mainly capacitive touch display devices. Due to the launch of the Apple's capacitive touch display device, its excellent touch function has made people swoon over it. Many touch display devices on the market today are following Apple's lead, and a variety of touch display devices were launched. With the development of the touch display devices, people are putting higher and higher demands on their optical performance, electrical performance and appearances.

SUMMARY

On the one hand, an embodiment of the present disclosure provides a display substrate, including:
  a base substrate;
  a plurality of first touch electrodes on the base substrate;
  a plurality of second touch electrodes on a side, facing away from the base substrate, of a layer where the first touch electrodes are located; where the second touch electrodes are insulated from the first touch electrodes; and
  a plurality of floating electrodes, where the floating electrodes are insulated from the plurality of first touch electrodes and the plurality of second touch electrodes; the floating electrodes are arranged on the same layer as at least one of the first touch electrodes or the second touch electrodes; and each of the floating electrodes has a mesh shape, and at least part of the floating electrodes are disconnected at at least part of dots.

Optionally, in the above touch substrate provided by the embodiment of the present disclosure, all the floating electrodes are disconnected at all the dots.

Optionally, in the above touch substrate provided by the embodiment of the present disclosure, distances from endpoints of the floating electrodes at disconnection positions to a center of the dot are the same.

Optionally, in the above touch substrate provided by the embodiment of the present disclosure, the distances from the endpoints of the floating electrodes at the disconnection positions to the center of the dot are 5 µm-10 µm.

Optionally, in the above touch substrate provided by the embodiment of the present disclosure, lengths of mesh lines between every two adjacent disconnection dots of the floating electrodes are the same.

Optionally, in the above touch substrate provided by the embodiment of the present disclosure, the plurality of floating electrodes include: a plurality of first floating electrodes on the same layer as the first touch electrodes, and a plurality of second floating electrodes on the same layer as the second touch electrodes;
  where orthographic projections of the disconnection dots of the plurality of first floating electrodes on the base substrate do not overlap orthographic projections of the disconnection dots of the plurality of second floating electrodes on the base substrate.

Optionally, in the above touch substrate provided by the embodiment of the present disclosure, the first touch electrodes and the second touch electrodes have mesh shapes;
  the first floating electrodes are located among the first touch electrodes, and located in meshes contained in the first touch electrodes; and the second floating electrodes are located among the second touch electrodes, and located in meshes contained in the second touch electrodes; and
  meshes contained in the first floating electrodes, meshes enclosed by the first floating electrodes and the first touch electrodes, meshes contained in the second floating electrodes, and meshes enclosed by the second floating electrodes and the second touch electrodes have approximately the same shape and size.

Optionally, in the above touch substrate provided by the embodiment of the present disclosure, the orthographic projections of the disconnection dots of the first floating electrodes on the base substrate are located in central areas of orthographic projections of the meshes contained in the second floating electrodes and the meshes enclosed by the second floating electrodes and the second touch electrodes on the base substrate; and
  the orthographic projections of the disconnection dots of the second floating electrodes on the base substrate are located in central areas of orthographic projections of the meshes contained in the first floating electrodes and the meshes enclosed by the first floating electrodes and the first touch electrodes on the base substrate.

Optionally, in the above touch substrate provided by the embodiment of the present disclosure, the orthographic projections of the disconnection dots of the first floating electrodes on the base substrate and the orthographic projections of the disconnection dots of the second floating electrodes on the base substrate are arranged in an array in an extending direction of the first touch electrodes and an extending direction of the second touch electrodes.

On the other hand, an embodiment of the present disclosure further provides a touch display device, including: a display panel, and the above touch substrate located on a display side of the display panel.

Optionally, the above touch display device provided by the embodiment of the present disclosure, further includes: an adhesive layer on the display side of the display panel; where, a side where the second touch electrodes are located and the display panel are fixed through the adhesive layer.

Optionally, in the above touch display device provided by the embodiment of the present disclosure, the display panel includes a color film substrate, and the color film substrate shares a base substrate with the touch substrate.

Optionally, in the above touch display device provided by the embodiment of the present disclosure, the display panel includes a plurality of light emitting devices, and an encapsulation layer on light-emitting sides of the plurality of light emitting devices, where, the encapsulation layer is multiplexed as the base substrate; and first touch electrodes are located on a side, facing away from a layer where the plurality of light emitting devices are located, of the encapsulation layer.

DETAILED DESCRIPTION OF THE EMBODIMENTS

Figure 1:
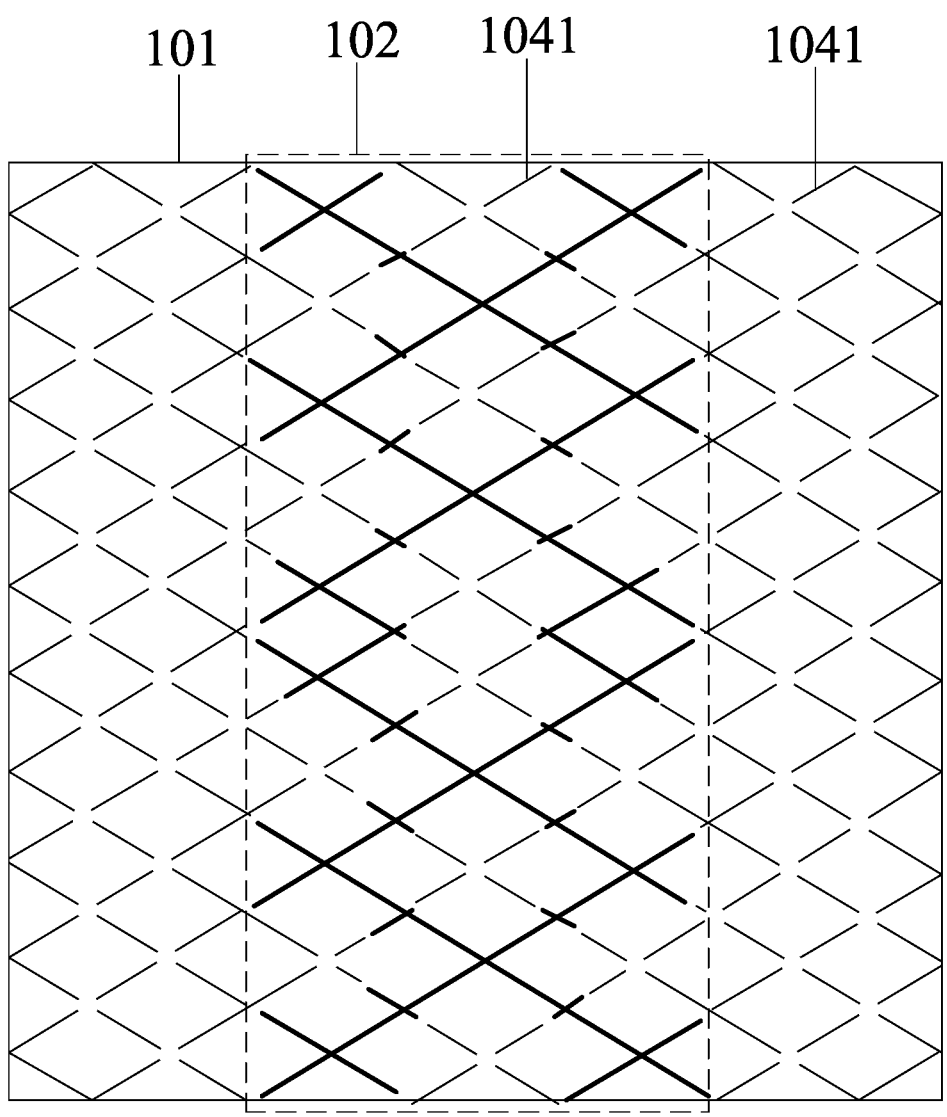
FIG. 1 is a schematic structural diagram of first touch electrodes and first floating electrodes provided by an embodiment of the present disclosure.

To make objectives, technical solutions and advantages of embodiments of the present disclosure clearer, the technical solutions of the embodiments of the present disclosure will be clearly and completely described below in conjunction with accompanying drawings of the embodiments of the present disclosure. It needs to be noted that sizes and shapes of all figures in the accompanying drawings do not reflect true scales, and are only intended to schematically illustrate the content of the present disclosure. The same or similar reference numerals represent the same or similar elements or elements with the same or similar functions all the time. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those ordinarily skilled in the art without creative work shall fall within the protection scope of the present disclosure.

Unless otherwise defined, technical or scientific terms used in the present disclosure shall have the ordinary meanings understood by those ordinarily skilled in the art to which the present disclosure pertains. The words "first", "second" and the like used in the present disclosure do not indicate any order, quantity or importance, but are only configured to distinguish different components. The words "comprise" or "include", and the like indicate that an element or item appearing before such words covers listed elements or items appearing after the words and equivalents thereof, and does not exclude other elements or items. The words "connect", or "couple" and the like are not limited to physical or mechanical connection, but may include electrical connection, whether direct or indirect. "Inner", "outer", "upper" and "lower" and the like are only used to represent relative position relationships, and the relative position relationships may also change accordingly after an absolute position of a described object changes.

As intelligent human-machine interaction interface products, touch display devices have been used in social production and life in an increasingly wide range of applications, and are in the most rapid development especially in the field of electronic products (smart phones, tablet personal computers and other fields). There is a wide variety of technologies of the touch display devices, mainly including resistive, capacitive, infrared and surface acoustic wave (SAW) touch display devices, etc. Based on characteristics of sensitive response, multi-touch support, long life, etc., the capacitive touch display devices have been widely used in social production and life.

With the massive use of the touch display devices, indium tin oxide (ITO) as an optically and electrically superior material is overused; and because the element indium (In) is a rare metal, this material is only becoming less available and more expensive. In this case, people slowly began to look for new materials to replace the ITO material, but the performance should not be inferior to that of the ITO material; and thus a touch display device using a metal mesh appears, which uses common metal materials, such as aluminum, copper and silver. The excellent low resistance performance of the metal mesh allows it to effectively piggyback on an active pen solution.

In the touch display device, a width of mesh lines of the metal mesh is usually 3 µm-6 µm, resulting in large dots at intersections of the mesh lines. When a resolution (PPI) of the touch display device is high, the dots may have an optical blocking effect on sub-pixels, resulting in black dot badness. Exemplarily, when the width of the mesh lines of the metal mesh is 4.5 µm, a size of each of the dots at the intersections of the mesh lines is around 15 μm*20 μm, while a size of each of the sub-pixels in the high-resolution product is about 22 μm*66 μm, so the light blocking effect of the dots on the sub-pixels may be very obvious, which will produce an obvious black dot phenomenon.

In view of the above problems in the related art, embodiments of the present disclosure provide a touch substrate, as shown in FIG. 1 to FIG. 9, including:

a base substrate 101;

a plurality of first touch electrodes 102 on the base substrate 101;

a plurality of second touch electrodes 103 on a side, facing away from the base substrate 101, of a layer where the plurality of first touch electrodes 102 are located; where the plurality of second touch electrodes 103 are insulated from the plurality of first touch electrodes 102; and a plurality of floating electrodes 104, where the plurality of floating electrodes 104 are insulated from the plurality of first touch electrodes 102 and the plurality of second touch electrodes 103; the plurality of floating electrodes 104 are arranged on the same layer as at least one of the plurality of first touch electrodes 102 or the plurality of second touch electrodes 103; and each floating electrode 104 has a mesh shape, and at least part of the floating electrodes 104 are disconnected on at least part of dots.

Figure 2:
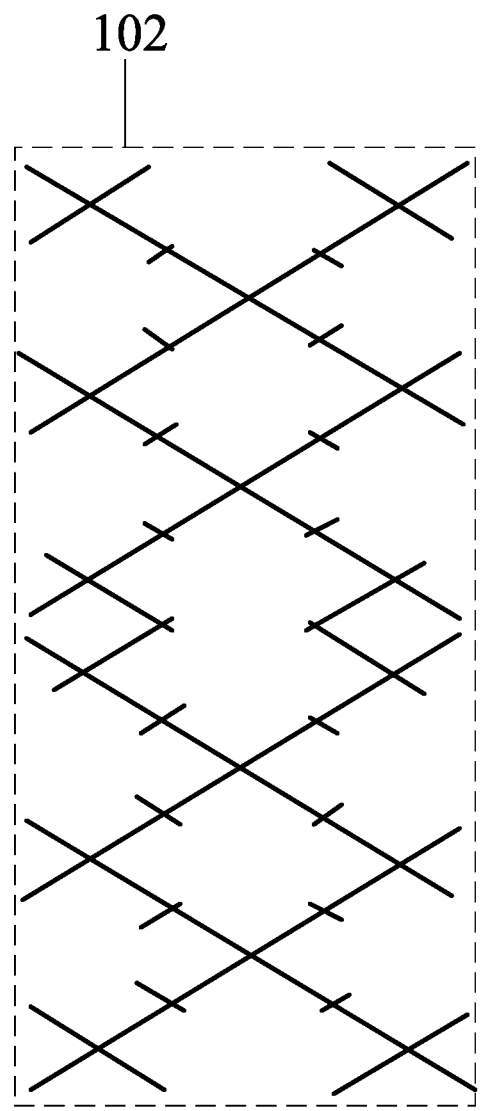
FIG. 2 is a schematic structural diagram of first touch electrodes provided by an embodiment of the present disclosure.
Figure 3:
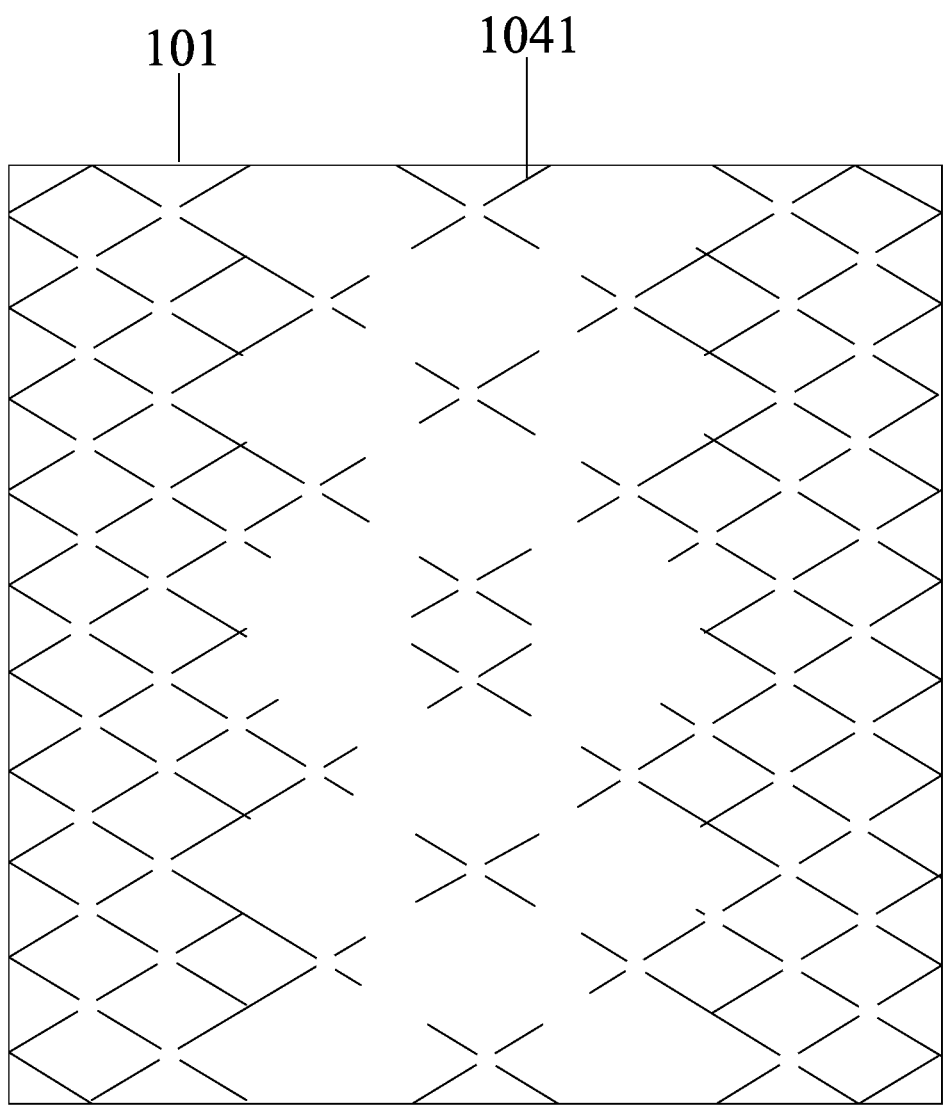
FIG. 3 is a schematic structural diagram of first floating electrodes provided by an embodiment of the present disclosure.
Figure 4:
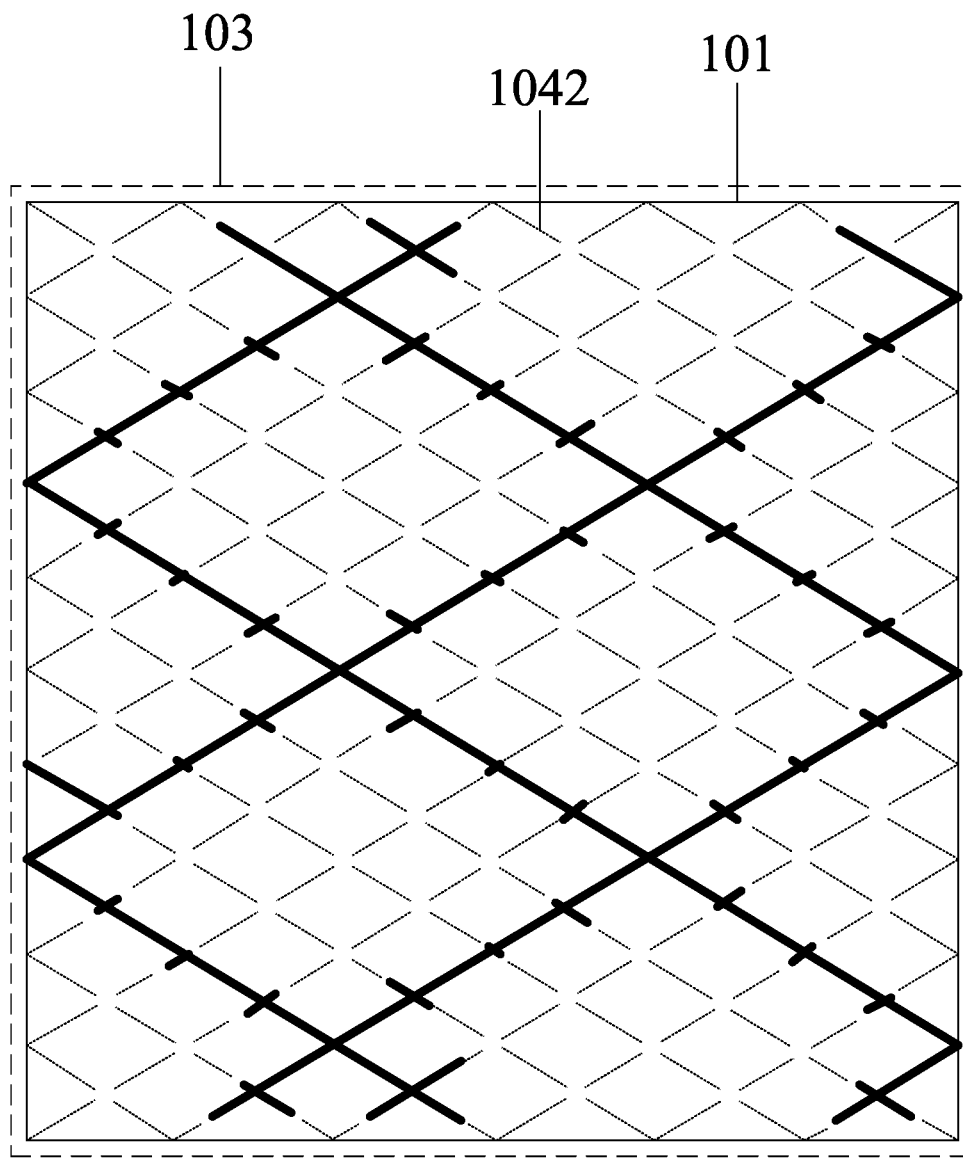
FIG. 4 is a schematic structural diagram of second touch electrodes and second floating electrodes provided by an embodiment of the present disclosure.

In the above touch substrate provided by the embodiments of the present disclosure, a metal mesh shape of the first touch electrodes 102 shown in FIG. 2 is different from a metal mesh shape of the second touch electrodes 103 shown in FIG. 4, resulting in reflectivity of first touch electrodes 102 being different from reflectivity of the second touch electrodes 103, and a difference in reflectivity of different film layers may cause severe shadow elimination badness. By arranging the floating electrodes 104, metal meshes of a layer where the first touch electrodes 102 are located and metal meshes of a layer where the second touch electrodes 103 are located may be evenly distributed, and thus a problem of shadow elimination caused by uneven distribution of the metal meshes is solved. Since the floating electrodes 104 are used for shadow elimination and the first touch electrodes 102 and the second touch electrodes 103 are used for touch recognition, a disconnection arrangement of the dots of at least part of the floating electrodes 104 in the present disclosure effectively not only solves black dot badness caused by too many dots, but also ensures normal use of a touch function.

Optionally, in the above touch substrate provided by the embodiments of the present disclosure, in order to better alleviate black dot badness, all the floating electrodes 104 may be arranged to be disconnected at all the dots.

Figure 10:
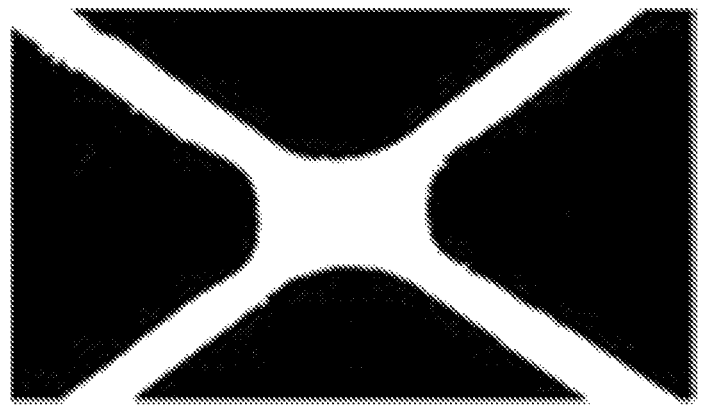
FIG. 10 is an enlarged schematic structural diagram of a mesh in the related art.
Figure 11:
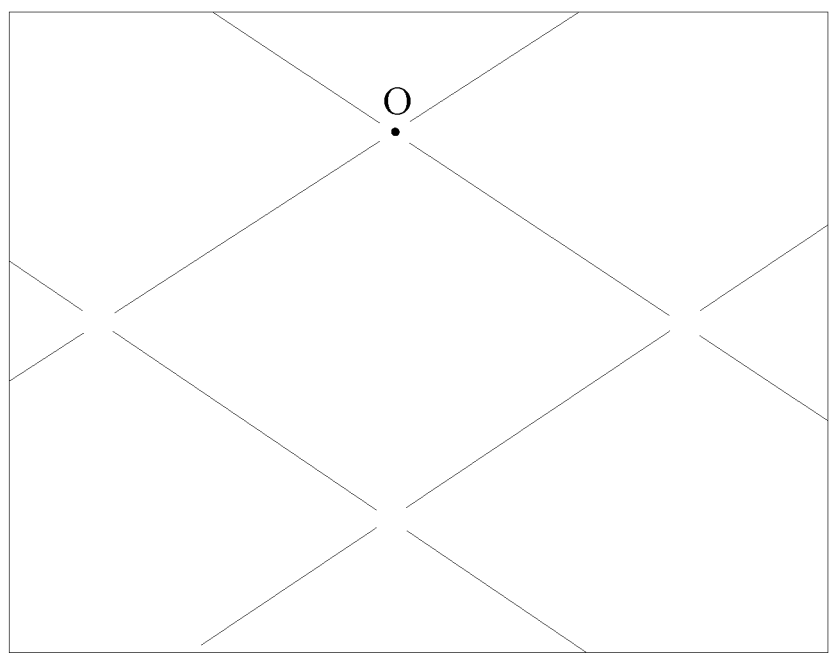
FIG. 11 is a schematic diagram of an excavation design of dots provided by an embodiment of the present disclosure.
Figure 12:
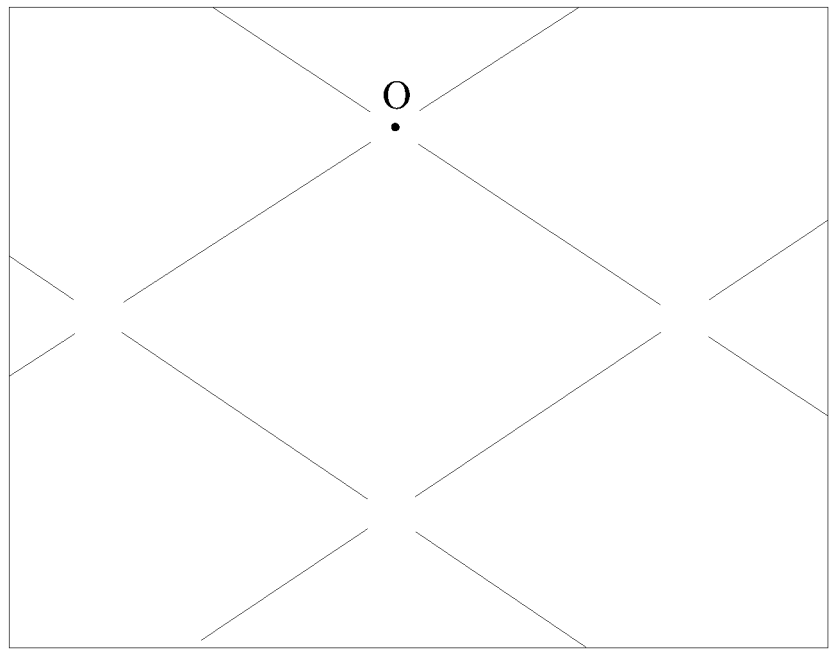
FIG. 12 is another schematic diagram of an excavation design of dots provided by an embodiment of the present disclosure.
Figure 13:
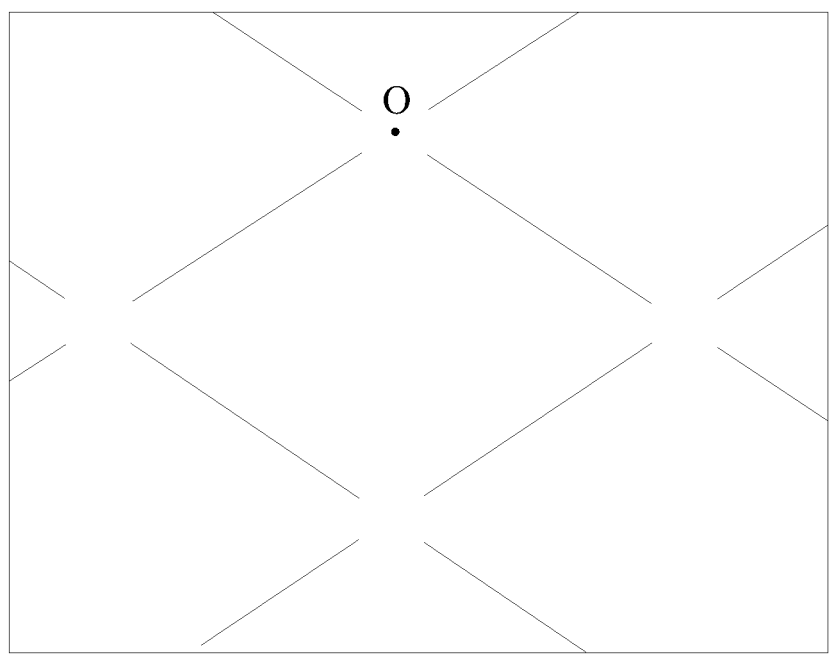
FIG. 13 is yet another schematic diagram of an excavation design of dots provided by an embodiment of the present disclosure.
Figure 14:
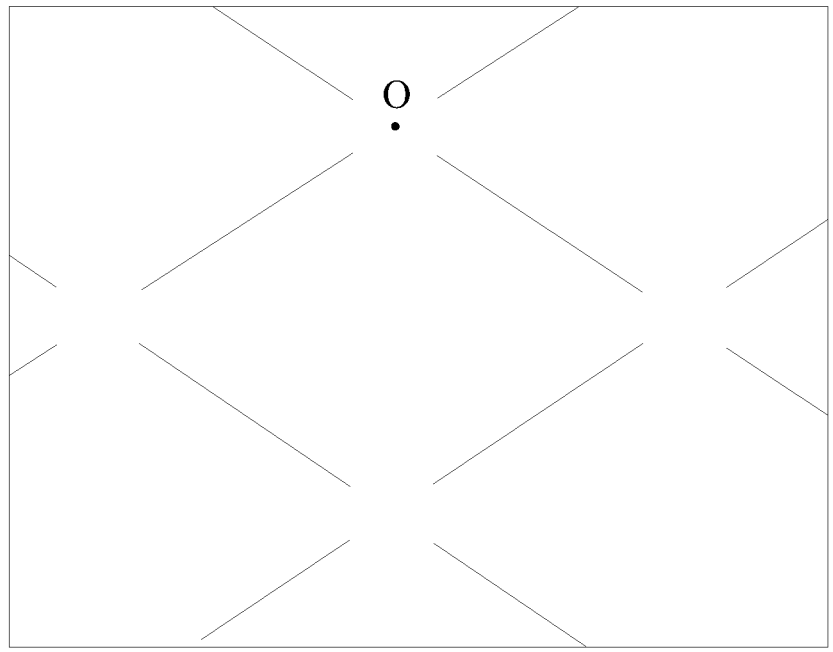
FIG. 14 is yet another schematic diagram of an excavation design of dots provided by an embodiment of the present disclosure.
Figure 15:
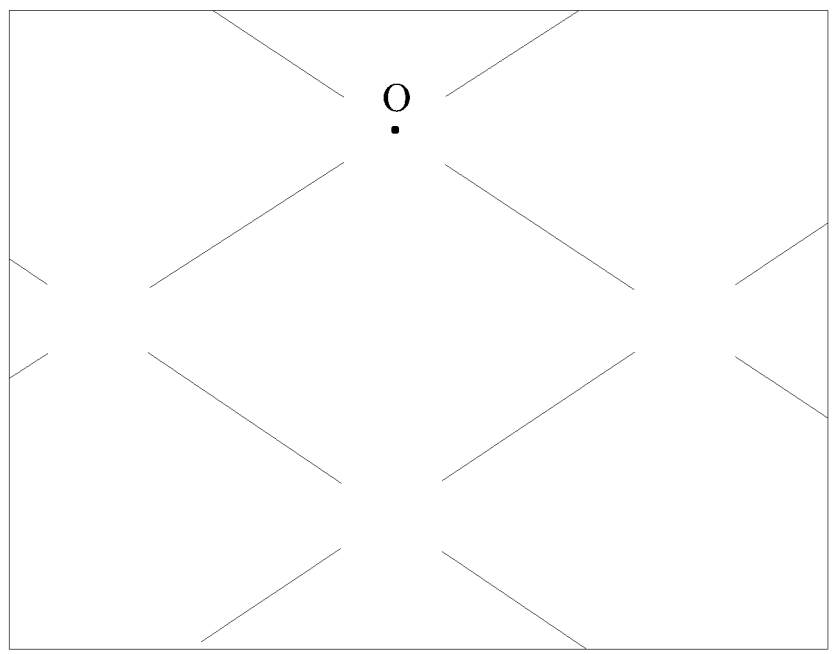
FIG. 15 is yet another schematic diagram of an excavation design of dots provided by an embodiment of the present disclosure.
Figure 16:
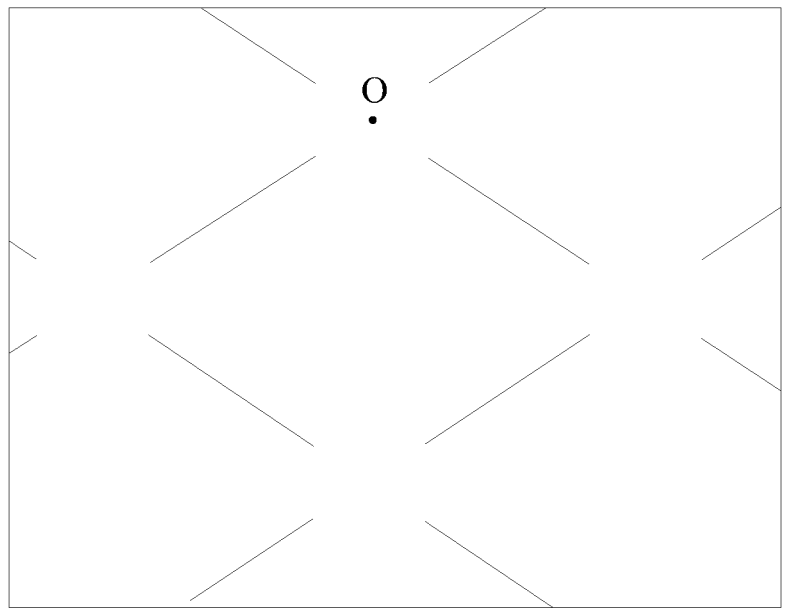
FIG. 16 is yet another schematic diagram of an excavation design of dots provided by an embodiment of the present disclosure.

As shown in FIG. 10, a dot shape of the floating electrodes 104 in the related art is generally a rectangle. Based on this, in the above touch substrate provided by the embodiments of the present disclosure, in order to effectively disconnect mesh lines at the dots, as shown in FIG. 11, distances from endpoints of the floating electrodes 104 at disconnection positions to a center O of the dot may be set as the same. In some embodiments, the rectangular dots may be excavated out directly, and at this time, the distances from the endpoints of the floating electrodes 104 at the disconnection positions to the center O of the dot are one half of a rectangular diagonal. In other embodiments, a pattern of the floating electrodes 104 in a circular area with the center O of the dot as a center of a circle and a distance greater than one half of the rectangular diagonal as a radius may also be excavated out, at this time, it is equivalent to excavating out the rectangular dot and the local mesh lines in its vicinity, and the distances from the endpoints of the floating electrodes 104 at the disconnection positions to the center O of the dot are equal to the radius of the circular area.

FIG. 11 to FIG. 16 shows dot excavation design diagrams with the distances from the endpoints of the floating electrodes 104 at the disconnection positions to the center O of the dot sequentially being 5 μm, 10 μm, 15 μm, 20 μm, 25 μm, and 30 μm respectively. Table 1 shows results of optical black dot alleviating levels of dot excavation designs of FIG. 11 to FIG. 16 for a 288-resolution product and a 410-resolution product. In Table 1, Lev1 indicates that the black dots are not visible, Lev2 indicates that the black dots are vaguely visible, Lev3 indicates that the black dots are clearly visible, and Lev4 indicates that black dots are unacceptable. As seen from Table 1, when the distances from the endpoints of the floating electrodes 104 at the disconnection positions to the center O of the dot are 5 μm-10 μm, it has a significant alleviating effect on the black dots and does not bring about moire badness.

TABLE 1

| Dot design | PPI: 288 | PPI: 410 |
| --- | --- | --- |
| Normal dot | Lev2.5 | Lev3 |
| 5 μm from endpoints to a center of the dot | Lev1.5 | Lev2 |
| 10 μm from endpoints to a center of the dot | Lev2 | Lev2.5 |
| 15 μm from endpoints to a center of the dot | Lev3, weak moire is generated | Lev3, weak moire is generated |
| 20 μm from endpoints to a center of the dot | Lev4, moire is generated | Lev4, moire is generated |
| 25 μm from endpoints to a center of the dot | Lev4, moire is generated | Lev4, moire is generated |
| 30 μm from endpoints to a center of the dot | Lev4, moire is generated | Lev4, moire is generated |

Optionally, in the above touch substrate provided by the embodiments of the present disclosure, the floating electrodes 104 have the same length of mesh lines between every two adjacent disconnection dots to better improve metal mesh shadow elimination.

Figure 9:
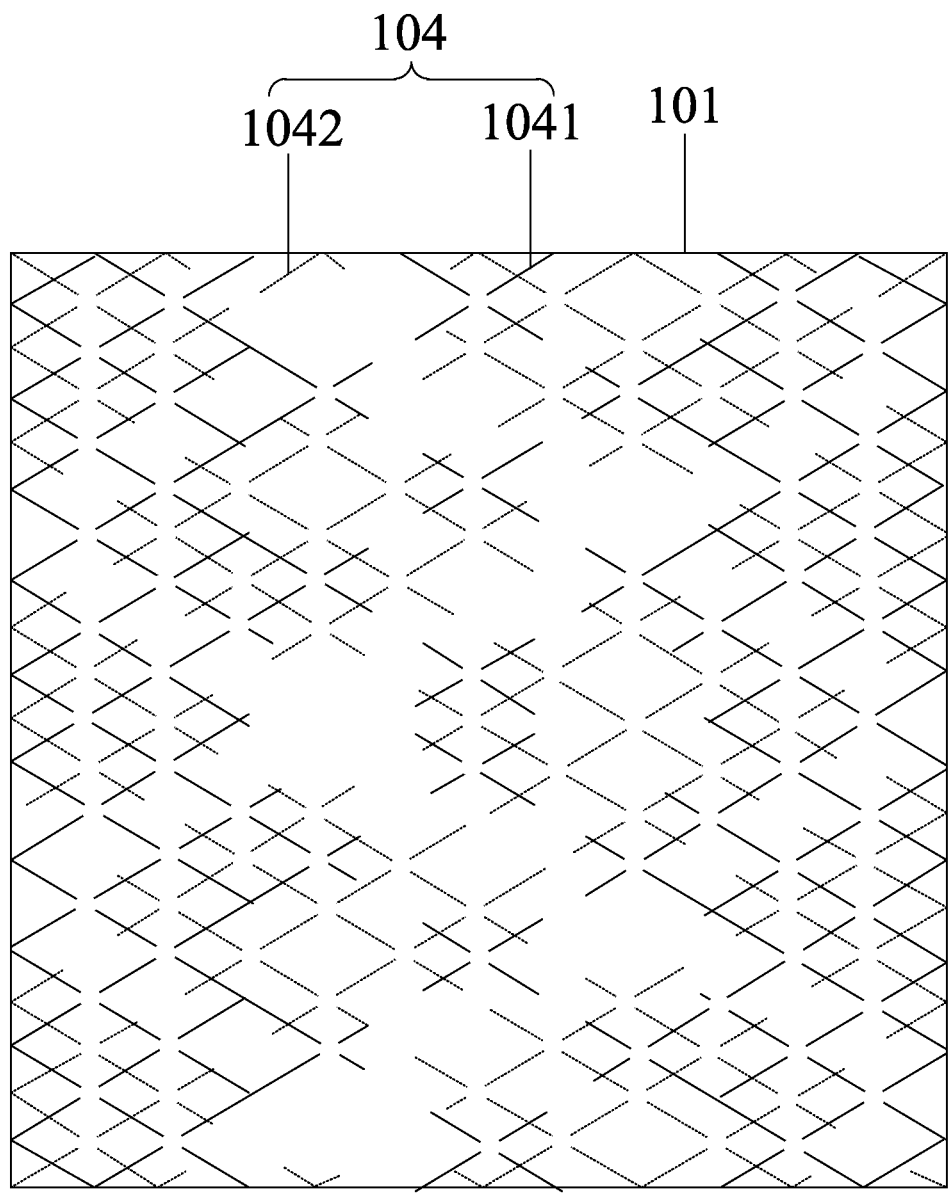
FIG. 9 is a laminated structure diagram of first floating electrodes and second floating electrodes provided by an embodiment of the present disclosure.

Optionally, in the above touch substrate provided by the embodiments of the present disclosure, as shown in FIG. 1, FIG. 4 and FIG. 9, the plurality of floating electrodes 104 include: a plurality of first floating electrodes 1041 on the same layer as the first touch electrodes 102, and a plurality of second floating electrodes 1042 on the same layer as the second touch electrodes 103; where orthographic projections of the disconnection dots of the plurality of first floating electrodes 1041 on the base substrate 101 do not overlap orthographic projections of the disconnection dots of the plurality of second floating electrodes 1042 on the base substrate 101.

Figure 5:
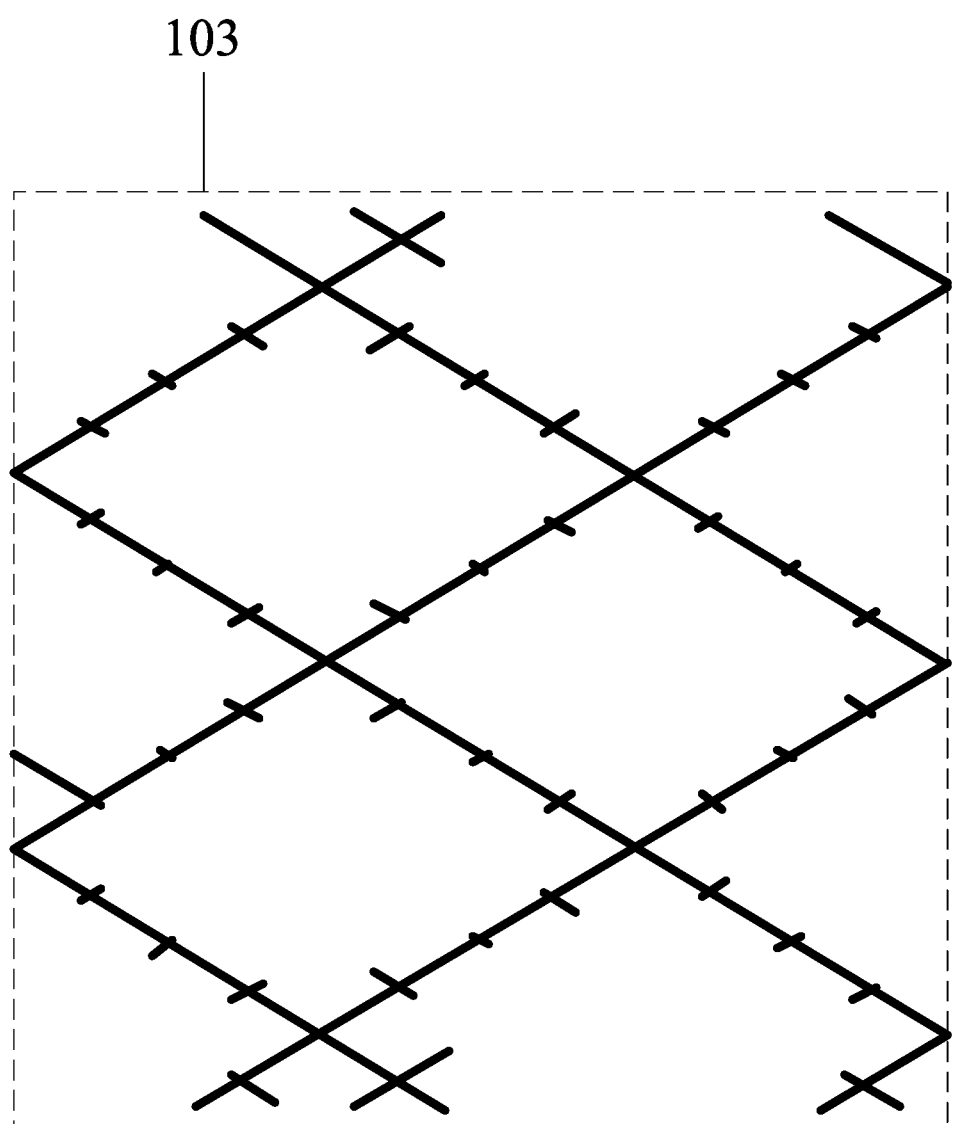
FIG. 5 is a schematic structural diagram of second touch electrodes provided by an embodiment of the present disclosure.
Figure 6:
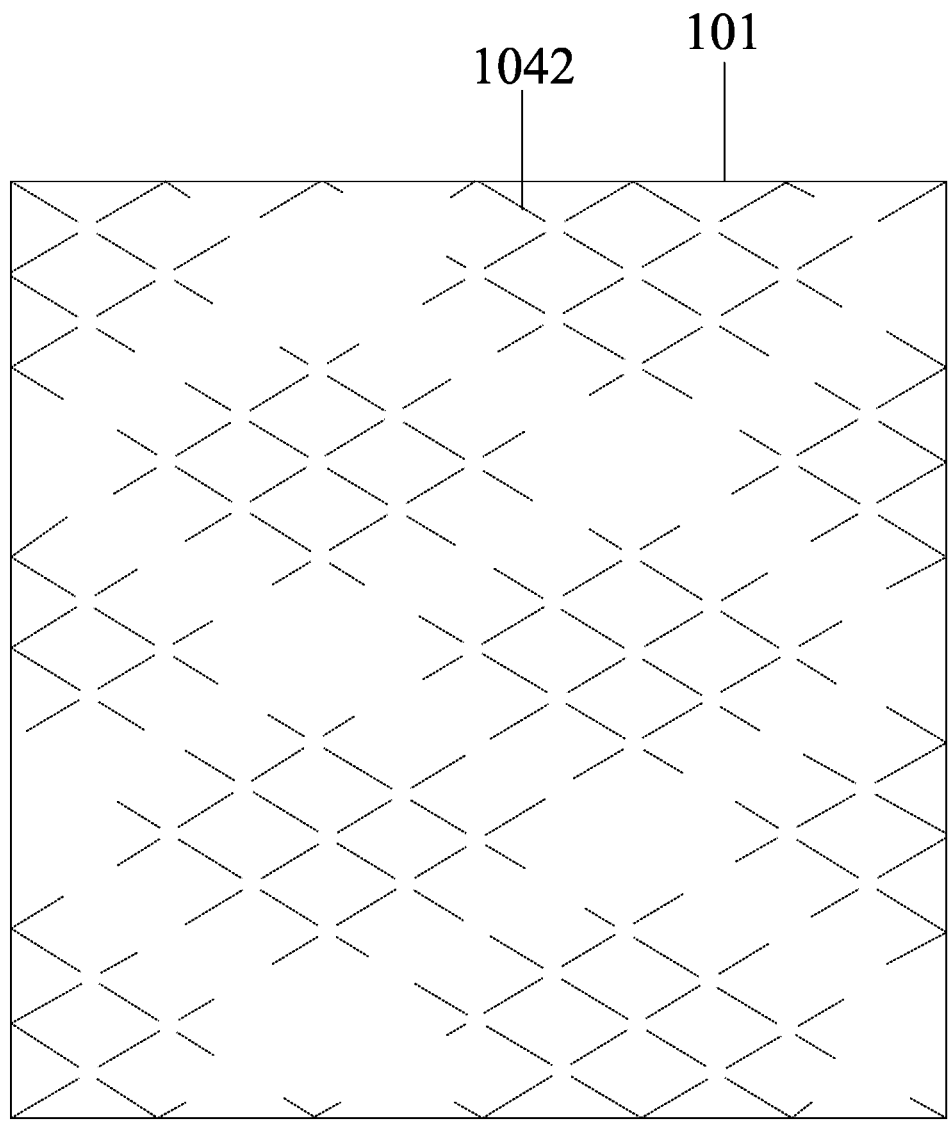
FIG. 6 is a schematic structural diagram of second floating electrodes provided by an embodiment of the present disclosure.

Optionally, in the above touch substrate provided by the embodiments of the present disclosure, the first touch electrodes and the second touch electrodes have mesh shapes, as shown in FIG. 2 and FIG. 5. The first floating electrodes 1041 are located among the first touch electrodes 102 and located in meshes contained in the first touch electrodes 102, as shown in FIG. 1. The second floating electrodes 1042 are located among the second touch electrodes 103 and located in meshes contained in the second touch electrodes 103, as shown in FIG. 4. Meshes contained in the first floating electrodes, meshes enclosed by the first floating electrodes and the first touch electrodes, meshes contained in the second floating electrodes, and meshes enclosed by the second floating electrodes and the second touch electrodes have approximately the same shape and size, as shown in FIG. 1 and FIG. 4. Thus, the meshes of a layer where the first touch electrodes 102 and the first floating electrodes 1041 are located, and the meshes of a layer where the second touch electrodes 103 and the second floating electrodes 1042 are located can be evenly and periodically distributed in an effective touch area (as shown in FIG. 7), thereby improving a shadow elimination effect.

It should be noted that in the present disclosure, approximately same may be understood as identical, or as the same within a tolerable margin of error caused by limits of technological conditions or other factors, which is not specifically limited here.

Figure 7:
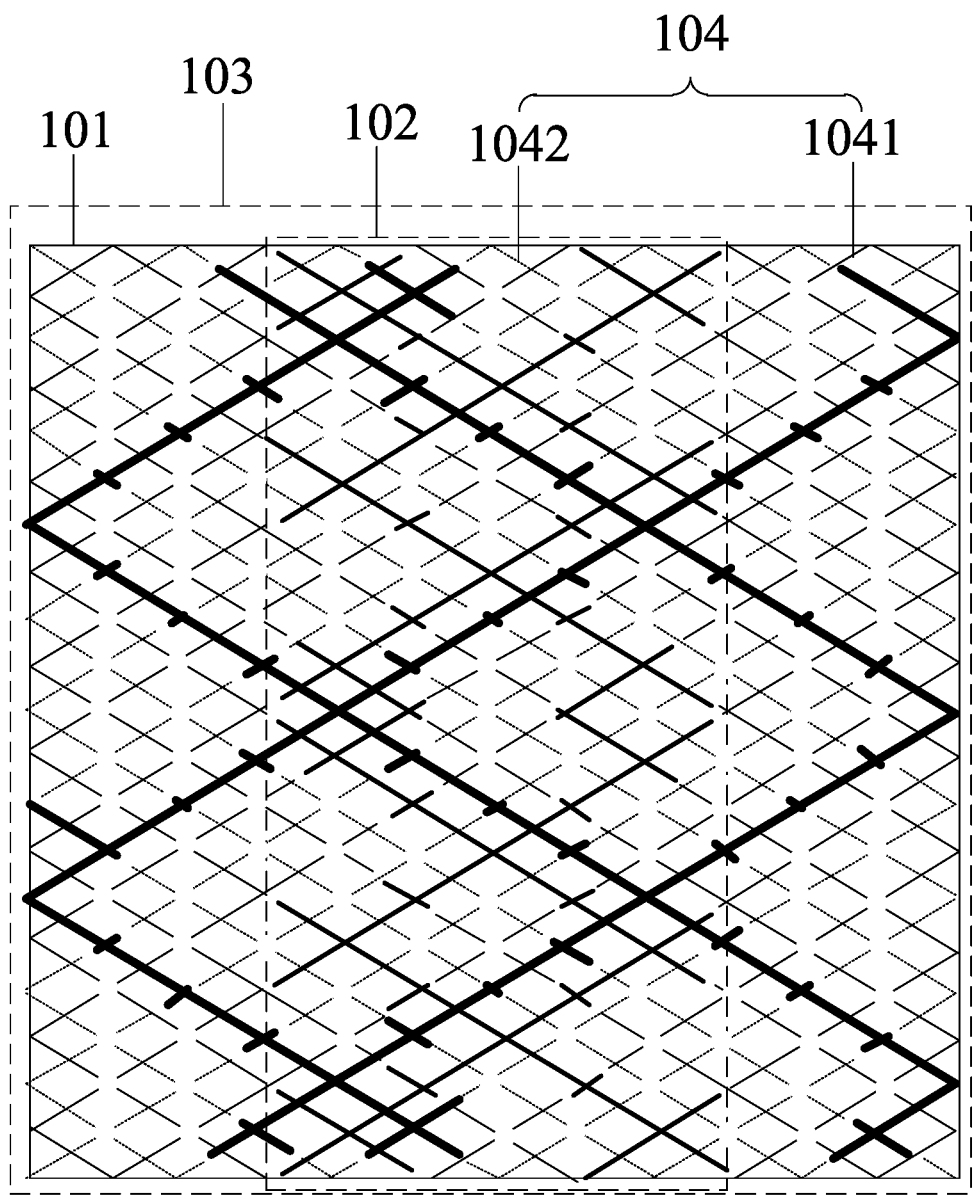
FIG. 7 is a schematic structural diagram of a touch substrate provided by an embodiment of the present disclosure.
Figure 8:
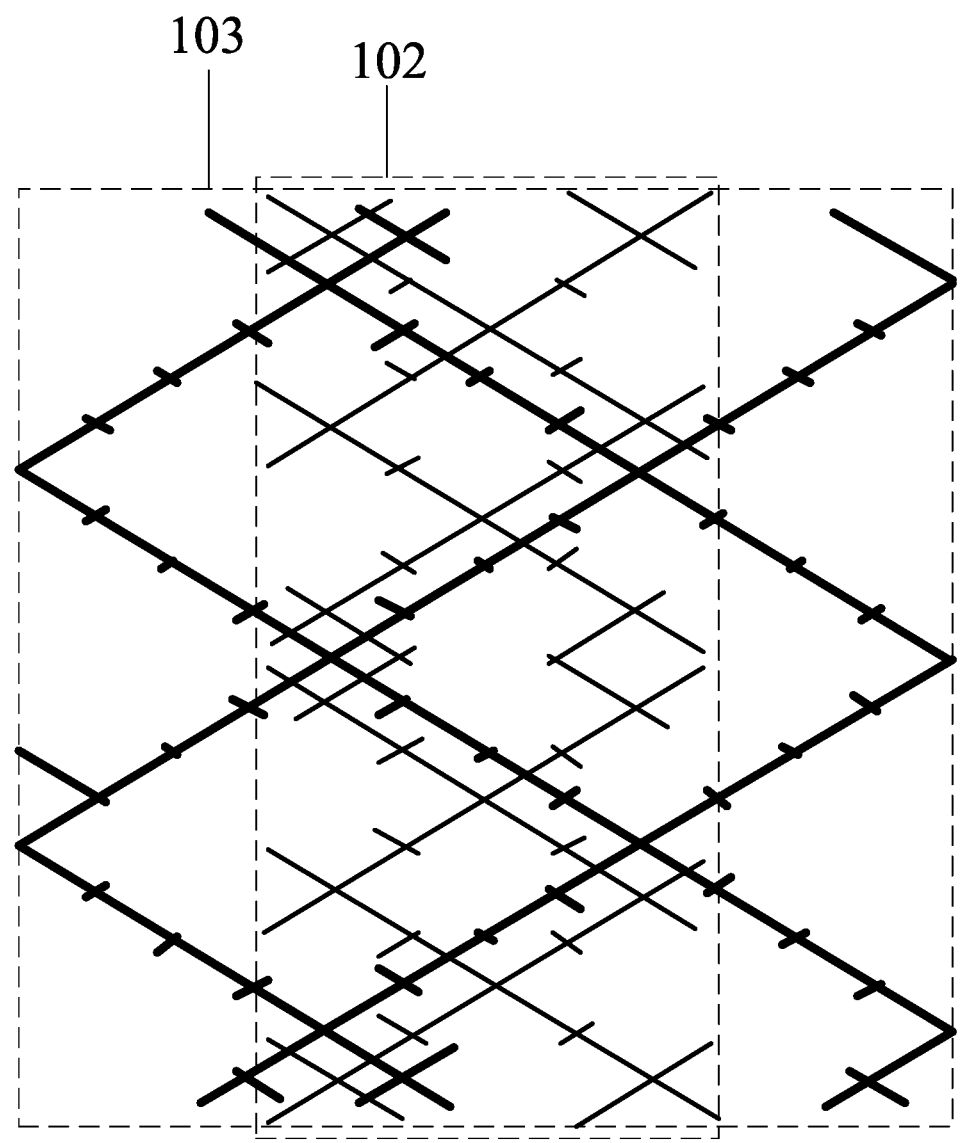
FIG. 8 is a laminated structure diagram of first touch electrodes and second touch electrodes provided by an embodiment of the present disclosure.

Optionally, in the above touch substrate provided by the embodiments of the present disclosure, as shown in FIG. 7, in order to ensure the shadow elimination effect, the orthographic projections of the disconnection dots of the first floating electrodes 1041 on the base substrate 101 may be located in central areas of orthographic projections of the meshes contained in the second floating electrodes 1042 and the meshes enclosed by the second floating electrodes 1042 and the second touch electrodes 103 on the base substrate 101; and the orthographic projections of the disconnection dots of the second floating electrodes 1042 on the base substrate 101 may be located in central areas of orthographic projections of the meshes contained in the first floating electrodes 1041 and the meshes enclosed by the first floating electrodes 1041 and the first touch electrodes 102 on the base substrate 101. In addition, the orthographic projections of the disconnection dots of the first floating electrodes 1041 on the base substrate 101 and the orthographic projections of the disconnection dots of the second floating electrodes 1042 on the base substrate 101 may be arranged in an array in an extending direction of the first touch electrodes 102 and an extending direction of the second touch electrodes 103.

Optionally, in the above touch substrate provided by the embodiments of the present disclosure, as shown in FIG. 1, the first touch electrodes 102 may be touch sensing electrodes (Rx) extending in a longitudinal direction, and the first touch electrodes 102 are disconnected from the first floating electrodes 1041; and as shown in FIG. 4, the second touch electrodes 103 may be touch driving electrodes (Tx) extending in a transverse direction, and the second touch electrodes 103 are disconnected from the second floating electrodes 1042. It should be understood that the larger a floating region where the first floating electrodes 1041 and the second floating electrodes 1042 are located, the more the dots that may be excavated out; and thus the black dot badness may be alleviated more effectively. Therefore, during specific implementation, in order to make an area of the floating region large, lengths of disconnection lines among the first touch electrodes 102 and the first floating electrodes 1041 and lengths of disconnection lines among the second touch electrodes 103 and the second floating electrodes 1042 may be set as short as possible. In addition, in order to make resistance values of all mesh lines contained in the first touch electrodes 102 similar, the disconnection lines on the mesh lines may be set to have an equal length and the same quantity; and preferably, the disconnection lines on the same mesh may be symmetrically distributed about a center of the mesh. Similarly, in order to make resistance values of all mesh lines contained in the second touch electrodes 103 similar, the disconnection lines on the mesh lines may be set to have an equal length and the same quantity, and preferably, the disconnection lines on the same mesh are symmetrically distributed about a center of the mesh.

Based on the same inventive concept, embodiments of the present disclosure further provide a touch display device, including the above touch substrate provided by the embodiments of the present disclosure. A principle for solving problems of the touch display device is similar to that of the aforementioned touch substrate, and thus implementation of the touch display device may refer to implementation of the aforementioned touch substrate, and repetitions are omitted here.

Figure 17:
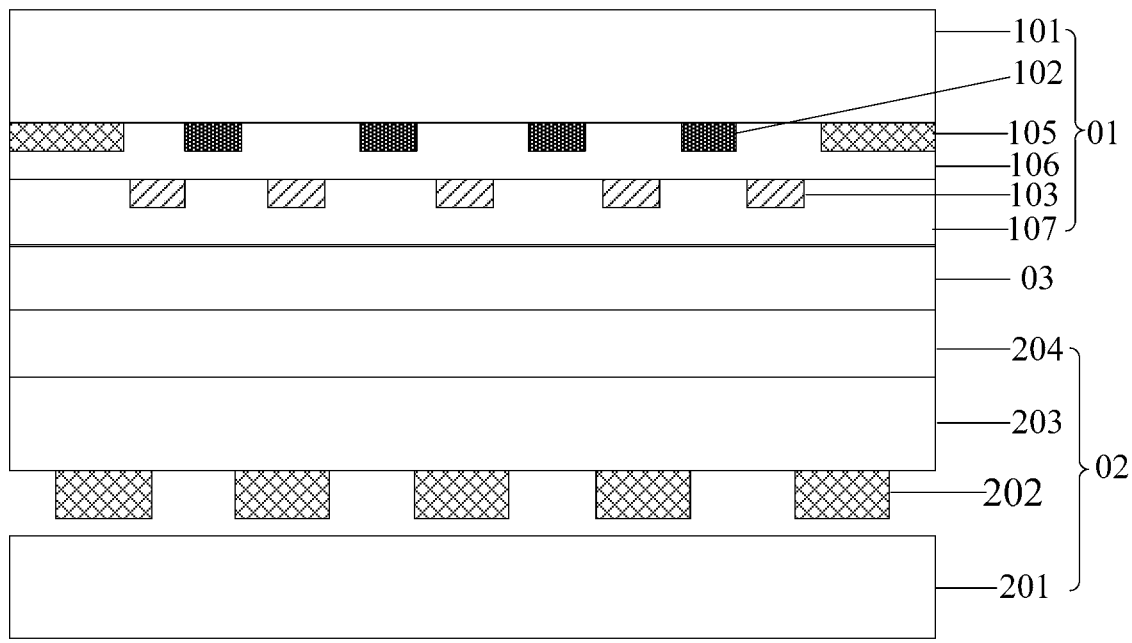
FIG. 17 is a schematic diagram of a touch display device provided by an embodiment of the present disclosure.
Figure 18:
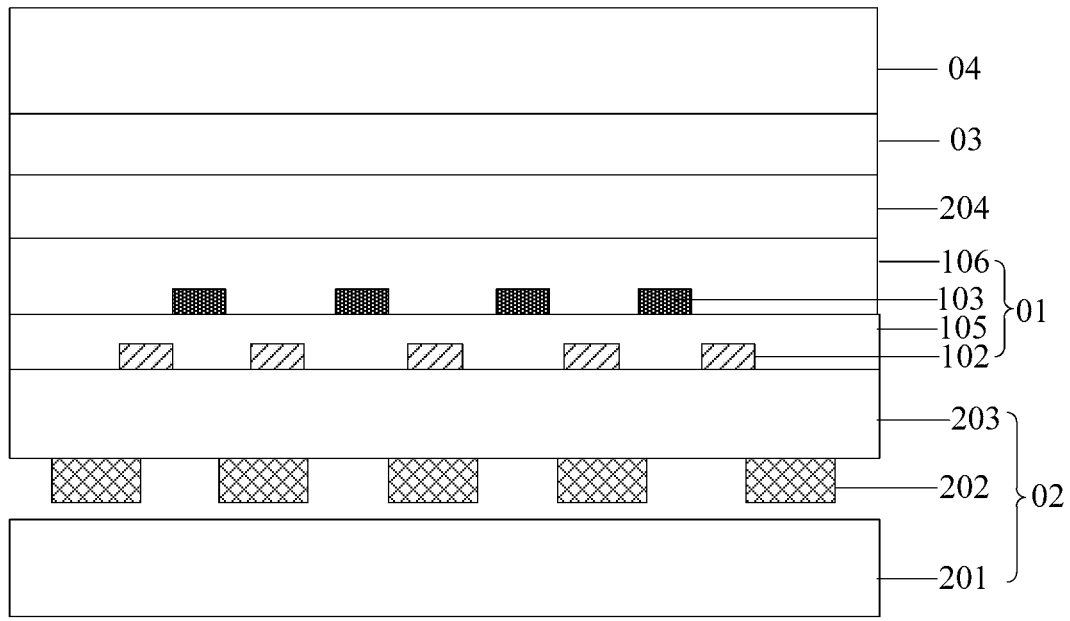
FIG. 18 is another schematic diagram of a touch display device provided by an embodiment of the present disclosure.

Specifically, embodiments of the present disclosure further provide a touch display device, as shown in FIG. 17 and FIG. 18, including: the above touch substrate 01 and a display panel 02, where the above touch substrate 01 is located on a display side of the display panel 02.

Specifically, the display panel 02 may include: a plurality of pixel units located in a display area and arranged in an array. Each pixel unit includes a plurality of sub-pixels. Exemplarily, the pixel units may include red sub-pixels, green sub-pixels and blue sub-pixels; and therefore red, green and blue may be mixed to achieve color display. Or, the pixel units may also include red sub-pixels, green sub-pixels, blue sub-pixels and white sub-pixels; and therefore red, green, blue and white may be mixed to achieve color display. Of course, in practical application, light emitting colors of the sub-pixels in the pixel units may be designed and determined according to practical application environments, which is not limited here.

In some embodiments, the display panel 02 may be a liquid crystal display panel, and at this time, the sub-pixels may include pixel electrodes located on an array substrate and thin film transistors (TFTs) electrically connected to the pixel electrodes. Of course, gate lines for transmitting gate scanning signals and data lines for transmitting data signals may further be arranged on the array substrate. In this way, the gate scanning signal are input to the TFTs through the gate lines to control conduction of the TFTs, and thus the data signals transmitted on the data lines are input to the pixel electrodes to make a voltage be input to the pixel electrodes, so as to drive liquid crystal molecules to rotate to display an image.

In some other embodiments, the display panel 02 may also be an electroluminescent display panel such as an organic light emitting display panel, a quantum dot light emitting diode or micro light emitting diode display panel, etc. At this time, the sub-pixels may include electroluminescent diodes and drive circuits for driving the electroluminescent diodes to emit light. Each electroluminescent diode includes an anode, a light emitting layer and a cathode; each drive circuit may include a drive transistor, a switching transistor and a storage capacitor; and a specific structure and working principle thereof may be the same as those in the prior art and will not be described here.

Figure 19:
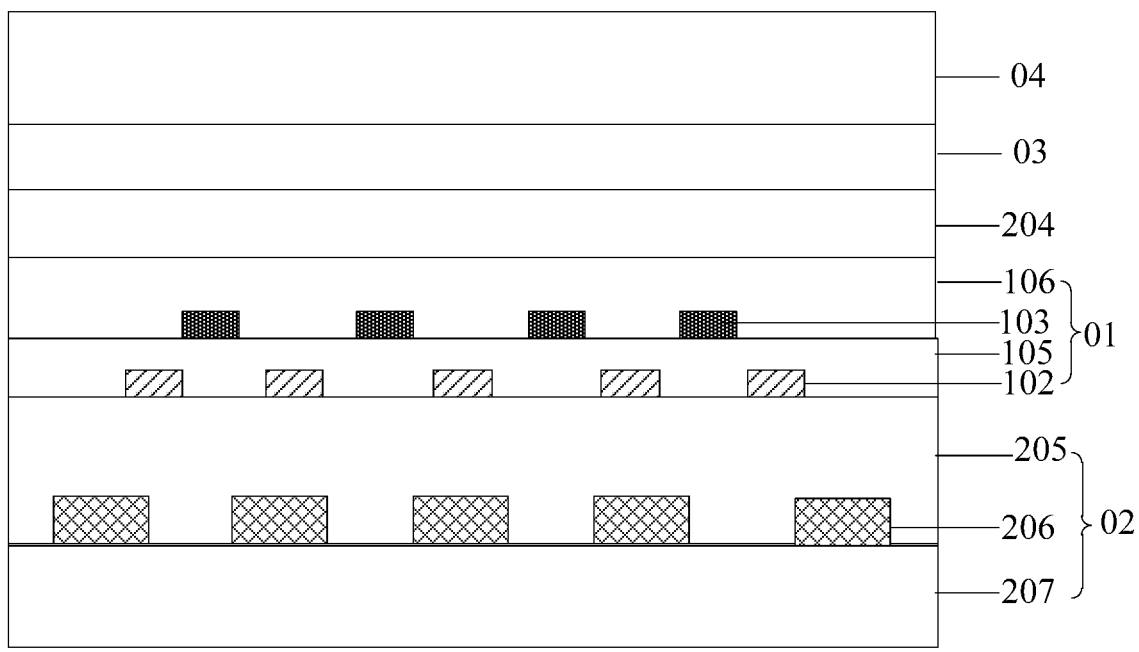
FIG. 19 is yet another schematic diagram of a touch display device provided by an embodiment of the present disclosure.

Optionally, in the above touch display device provided by the embodiments of the present disclosure, a side where the second touch electrodes 103 are located may be fixed to the display panel 02 through an adhesive layer 03, as shown in FIG. 17. In other words, the touch substrate 01 is mounted externally on the display side of the display panel 02. Or, the touch substrate 01 is embedded in the display panel 02, as shown in FIG. 18 and FIG. 19.

Specifically, in FIG. 17, the display panel 02 is shown specifically as a liquid crystal display panel, including an array substrate 201, a color film substrate 203 having a black matrix 202, and a polarizer 204. In addition, the touch substrate 01 may further include a shielding layer 105 distributed around the effective touch area, and a first insulating layer 106 and a second insulating layer 107 arranged on a whole layer. FIG. 18 illustrates that the color film substrate 203 of the liquid crystal display panel shares a base substrate 101 with the touch substrate 01, and the touch display device further includes a protective cover plate 04. FIG. 19 illustrates that an encapsulation layer 205 of the electroluminescent display panel is multiplexed as the base substrate 101 of the touch substrate 01; and first touch electrodes 102 are located on a side, facing away from a layer where a plurality of light emitting devices 206 contained in the electroluminescent display panel are located, of the encapsulation layer 205. In addition, the electroluminescent display panel may further include a drive back plane 207.

Figure 20:
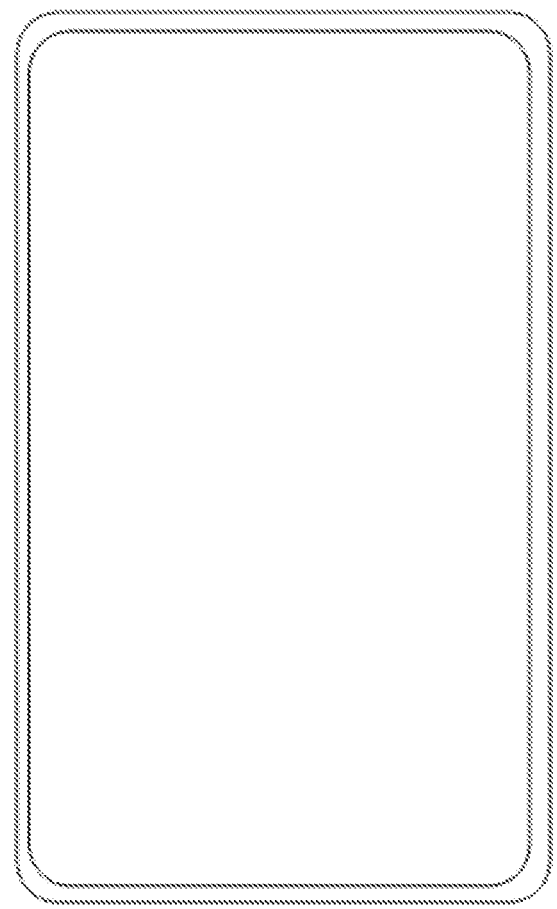
FIG. 20 is yet another schematic diagram of a touch display device provided by an embodiment of the present disclosure.

During specific embodiments, the touch display device provided by the embodiments of the present disclosure may be a cell phone with a full screen shown in FIG. 20. Of course, the touch display device provided by the embodiments of the present disclosure may also be: a tablet computer, a television, a monitor, a laptop, a digital photo frame, a navigator, and any other products or components with display functions. Other essential components of the touch display device shall be understood by those ordinarily skilled in the art, are omitted here and also shall not become a restriction to the present disclosure.

The touch display device shown in FIG. 17 may be fabricated by following steps.

Step 1, a shielding layer 105 is fabricated in an edge area of a base substrate 101.

Step 2, first touch electrodes 102 and first floating electrodes 1041 arranged on the same layer are fabricated on a side, facing away from the base substrate 101, of the shielding layer 105. The first touch electrodes 102 and the first floating electrodes 1041 are disconnected from one another, and the first floating electrodes 1041 are disconnected at the dots.

Step 3, a first insulating layer 106 is fabricated on a layer where the first touch electrodes 102 and the first floating electrodes 1041 are located.

Step 4, second touch electrodes 103 and second floating electrodes 1042 arranged on the same layer are fabricated on a side, facing away from the base substrate 101, of the first insulating layer 106. The second touch electrodes 103 and the second floating electrodes 1042 are disconnected from one another, and the second floating electrodes 1042 are disconnected at the dots.

Step 5, a second insulating layer 107 is fabricated on a layer where the second touch electrodes 103 and the second floating electrodes 1042 are located.

Step 6, a display panel 02 is fabricated, and a fabricating process of the display panel 02 is the same as that in the prior art, which is omitted here.

Step 7, the second insulating layer 107 and a polarizer 204 contained in the display panel 02 are fixed together through an adhesive layer 03.

At this point, fabricating of the touch display device shown in FIG. 17 is completed.

The touch display device shown in FIG. 18 may be fabricated by following steps.

Step 1, a display panel 02 including an array substrate 201 and a color film substrate 203 is fabricated by using fabricating steps in the related art.

Step 2, second touch electrodes 103 and second floating electrodes 1042 arranged on the same layer are fabricated on a side, facing away from the array substrate 201, of the color film substrate 203. The second touch electrodes 103 and the second floating electrodes 1042 are disconnected from one another, and the second floating electrodes 1042 are disconnected at the dots.

Step 3, a first insulating layer 106 is fabricated on a layer where the second touch electrodes 103 and the second floating electrodes 1042 are located.

Step 4, first touch electrodes 102 and first floating electrodes 1041 arranged on the same layer are fabricated on a side, facing away from a base substrate 101, of the first insulating layer 106. The first touch electrodes 102 and the first floating electrodes 1041 are disconnected from one another, and the first floating electrodes 1041 are disconnected at the dots.

Step 5, a second insulating layer 107 is fabricated on a layer where the first touch electrodes 102 and the first floating electrodes 1041 are located.

Step 6, a polarizer 204 is attached to the second insulating layer 107, and the polarizer 204 and a protective cover plate 04 are fixed together through an adhesive layer 03.

At this point, fabricating of the touch display device shown in FIG. 18 is completed.

It should be noted that in the above fabricating methods provided by the embodiments of the present disclosure, composition technologies involved in forming layers of structure may not only include some or all of technological processes such as deposition, coating of photoresist, masking of a mask, exposure, development, etching and stripping of the photoresist, but also include other technological processes, specifically depending on an actual fabricating process of forming a pattern of required composition, which is not be limited here. For example, a post-baking technology may further be included after development and before etching.

The deposition technology may be chemical vapor deposition, plasma-enhanced chemical vapor deposition or physical vapor deposition, which is not limited here; the mask used in the masking technology may be a half tone mask, a single slit mask or a gray tone mask, which is not limited here; and etching may be dry etching or wet etching, which is not limited here.

In addition, it should be understood that in the present disclosure, "arranged on the same layer" refers to a layer structure that is formed through a single composition technology by using the same mask after a film layer for fabricating a specific pattern is formed through the same film forming technology. That is, a single composition technology corresponds to one mask (also known as a photomask). Depending on the difference of specific patterns, a single composition technology may include multiple exposure, development or etching technologies, and the specific patterns in the formed layer structure may be continuous or discontinuous, and these specific patterns may also be at different heights or have different thicknesses.

Apparently, those skilled in the art can make various changes and modifications to the embodiments of the present disclosure without departing from the spirit and scope of the embodiments of the present disclosure. Therefore, if these changes and modifications to the embodiments of the present disclosure fall within the scope of the claims of the present disclosure and their equivalent technologies, the present disclosure is also intended to include these changes and modification.

What is claimed is:

1. A touch substrate, comprising:
   a base substrate;
   a plurality of first touch electrodes on the base substrate;

a plurality of second touch electrodes on a side, facing away from the base substrate, of a layer where the plurality of first touch electrodes are located, wherein the plurality of second touch electrodes are insulated from the plurality of first touch electrodes; and a plurality of floating electrodes, wherein the plurality of floating electrodes are insulated from the plurality of first touch electrodes and the plurality of second touch electrodes; the plurality of floating electrodes are arranged on a same layer as at least one of the plurality of first touch electrodes or the plurality of second touch electrodes; and each of the plurality of floating electrodes has a mesh shape, and all floating electrodes are disconnected at all dots;

wherein, the dots are dots at which mesh lines of the floating electrodes intersect;

wherein, distances from endpoints of the floating electrodes at disconnection positions to a center of the dot are same.

2. The touch substrate according to claim 1, wherein, the distances from the endpoints of the floating electrodes at the disconnection positions to the center of the dot are 5 μm-10 μm.

3. The touch substrate according to claim 1, wherein, lengths of mesh lines between every two adjacent disconnection dots of the floating electrodes are same.

4. The touch substrate according to claim 1, wherein, the plurality of floating electrodes comprise: a plurality of first floating electrodes on a same layer as the plurality of first touch electrodes, and a plurality of second floating electrodes on a same layer as the plurality of second touch electrodes;

wherein, orthographic projections of disconnection dots of the plurality of first floating electrodes on the base substrate do not overlap orthographic projections of disconnection dots of the plurality of second floating electrodes on the base substrate.

5. The touch substrate according to claim 4, wherein, the plurality of first touch electrodes and the plurality of second touch electrodes have mesh shapes;

the plurality of first floating electrodes are located among the plurality of first touch electrodes, and located in meshes contained in the plurality of the first touch electrodes; and the plurality of second floating electrodes are located among the plurality of second touch electrodes, and located in meshes contained in the plurality of the second touch electrodes; and meshes contained in the plurality of first floating electrodes, meshes enclosed by the plurality of first floating electrodes and the plurality of first touch electrodes, meshes contained in the plurality of second floating electrodes, and meshes enclosed by the plurality of second floating electrodes and the plurality of second touch electrodes have approximately a same shape and size.

6. The touch substrate according to claim 5, wherein, the orthographic projections of the disconnection dots of the plurality of first floating electrodes on the base substrate are located in central areas of orthographic projections of the meshes contained in the plurality of second floating electrodes and the meshes enclosed by the plurality of second floating electrodes and the plurality of second touch electrodes on the base substrate; and the orthographic projections of the disconnection dots of the plurality of second floating electrodes on the base substrate are located in central areas of orthographic projections of the meshes contained in the plurality of first floating electrodes and the meshes enclosed by the plurality of first floating electrodes and the plurality of first touch electrodes on the base substrate.

7. The touch substrate according to claim 6, wherein, the orthographic projections of the disconnection dots of the plurality of first floating electrodes on the base substrate and the orthographic projections of the disconnection dots of the plurality of second floating electrodes on the base substrate are arranged in an array in an extending direction of the plurality of first touch electrodes and an extending direction of the plurality of second touch electrodes.

8. A touch display device, comprising: a display panel, and the touch substrate according to claim 1 located on a display side of the display panel.

9. The touch display device according to claim 8, further comprising: an adhesive layer on the display side of the display panel;

wherein, a side where the plurality of second touch electrodes are located and the display panel are fixed through the adhesive layer.

10. The touch display device according to claim 8, wherein, the display panel comprises a color film substrate, and the color film substrate shares the base substrate with the touch substrate.

11. The touch display device according to claim 8, wherein, the display panel comprises a plurality of light emitting devices, and an encapsulation layer on light-emitting sides of the plurality of light emitting devices;

wherein, the encapsulation layer is multiplexed as the base substrate; and the plurality of first touch electrodes are located on a side, facing away from a layer where the plurality of light emitting devices are located, of the encapsulation layer.

* * * * *